US010981467B2

(12) United States Patent
Kinoshita

(10) Patent No.: US 10,981,467 B2
(45) Date of Patent: Apr. 20, 2021

(54) VEHICLE POWER SUPPLY APPARATUS

(71) Applicant: SUBARU CORPORATION, Tokyo (JP)

(72) Inventor: Takahiro Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 428 days.

(21) Appl. No.: 15/951,024

(22) Filed: Apr. 11, 2018

(65) Prior Publication Data

US 2018/0370382 A1 Dec. 27, 2018

(30) Foreign Application Priority Data

Jun. 26, 2017 (JP) .............................. JP2017-124008

(51) Int. Cl.
*B60L 58/12* (2019.01)
*B60L 11/18* (2006.01)
(Continued)

(52) U.S. Cl.
CPC ................ *B60L 58/12* (2019.02); *B60L 1/00* (2013.01); *B60L 7/22* (2013.01); *B60L 11/1861* (2013.01);
(Continued)

(58) Field of Classification Search
CPC ...................................................... B60L 58/12
(Continued)

(56) References Cited

U.S. PATENT DOCUMENTS

2006/0097577 A1* 5/2006 Kato ..................... H02J 7/1423
307/10.1
2011/0012424 A1* 1/2011 Wortberg .............. H02J 7/1423
307/10.1
(Continued)

FOREIGN PATENT DOCUMENTS

JP 2004-229478 A 8/2004
JP 2014-005816 A 1/2014
(Continued)

OTHER PUBLICATIONS

Japanese Office Action, dated Mar. 19, 2019, in Japanese Application No. 2017-124008 and English Translation thereof.
Japanese Office Action, dated Oct. 30, 2018, in Japanese Application No. 2017-124008 and English Translation thereof.

*Primary Examiner* — Jerry D Robbins
(74) *Attorney, Agent, or Firm* — McGinn IP Law Group, PLLC

(57) ABSTRACT

A vehicle power supply apparatus includes a generator, a first electricity storage, a second electricity storage, a switch, a generator controller, and a switch controller. The generator controller controls the generator into a first electric power generation state and a second electric power generation state higher in electric power generation voltage than the first electric power generation state. The switch controller controls the switch into an electrically-conductive state and a cutoff state. The switch controller controls the switch into the electrically-conductive state and the generator controller controls the generator into the first electric power generation state when a high-load apparatus is stopped. The high-load apparatus is one of a plurality of electrical loads coupled to the first electricity storage. The switch controller controls the switch into the cutoff state and the generator controller controls the generator into the second electric power generation state when the high-load apparatus is in operation.

20 Claims, 12 Drawing Sheets

(51) Int. Cl.
  *B60L 7/22* (2006.01)
  *H02J 7/00* (2006.01)
  *H02J 7/14* (2006.01)
  *B60L 58/15* (2019.01)
  *B60L 1/00* (2006.01)
  *B60L 58/20* (2019.01)

(52) U.S. Cl.
  CPC ............... *B60L 58/15* (2019.02); *B60L 58/20* (2019.02); *H02J 7/0003* (2013.01); *H02J 7/0024* (2013.01); *H02J 7/1423* (2013.01); *B60L 2240/12* (2013.01); *B60L 2240/44* (2013.01); *B60L 2240/54* (2013.01); *B60L 2260/22* (2013.01); *B60L 2260/26* (2013.01)

(58) Field of Classification Search
  USPC .......................................................... 320/134
  See application file for complete search history.

(56) References Cited

U.S. PATENT DOCUMENTS

| | | | | |
|---|---|---|---|---|
| 2016/0016483 | A1* | 1/2016 | Yasunori | ............... B60L 15/007 320/162 |
| 2016/0039370 | A1* | 2/2016 | Suzuki | ...................... B60L 7/26 307/10.1 |
| 2016/0288652 | A1* | 10/2016 | Suzuki | .................... B60L 15/20 |
| 2016/0290305 | A1 | 10/2016 | Kinoshita | |
| 2017/0151876 | A1* | 6/2017 | Kinoshita | ............... B60L 58/15 |
| 2018/0265021 | A1 | 9/2018 | Koishi et al. | |

FOREIGN PATENT DOCUMENTS

| | | |
|---|---|---|
| JP | 2014-036557 A | 2/2014 |
| JP | 2016-039770 A | 3/2016 |
| JP | 2016-194253 A | 11/2016 |
| WO | WO 2016/174772 A1 | 11/2016 |
| WO | WO 2017/051444 A1 | 3/2017 |

* cited by examiner

VEHICLE POWER SUPPLY APPARATUS

CROSS-REFERENCE TO RELATED APPLICATIONS

The present application claims priority from Japanese Patent Application No. 2017-124008 filed on Jun. 26, 2017, the entire contents of which are hereby incorporated by reference.

BACKGROUND

The technology relates to a vehicle power supply apparatus to be mounted on a vehicle.

Various proposals have been made on a vehicle power supply apparatus to be mounted on a vehicle. For example, Japanese Unexamined Patent Application Publication (JP-A) No. 2014-36557 proposes a power supply apparatus that includes a generator, such as an alternator coupled to an engine. The power supply apparatus disclosed in JP-A No. 2014-36557 also includes a lead-acid battery and a lithium-ion battery as electricity storages. The lead-acid battery and the lithium-ion battery are coupled in parallel to each other. Such a configuration makes it possible to store electric power derived from regeneration not only in the lead-acid battery but also in the lithium-ion battery when the generator is caused to generate electricity by means of the regeneration upon deceleration of a vehicle. This in turn makes it possible to increase the electric power derived from the regeneration and thereby to enhance a fuel consumption performance of the vehicle.

SUMMARY

An aspect of the technology provides a vehicle power supply apparatus that includes: a generator coupled to an engine; a first electricity storage able to be coupled to the generator; a second electricity storage able to be coupled to the generator in parallel to the first electricity storage; a switch configured to switch from electric conduction between the generator and the second electricity storage to cutoff between the generator and the second electricity storage and vice versa; a generator controller configured to control the generator into a first electric power generation state and a second electric power generation state that is higher in electric power generation voltage than the first electric power generation state; and a switch controller configured to control the switch into an electrically-conductive state and a cutoff state. The switch controller is configured to control the switch into the electrically-conductive state and the generator controller is configured to control the generator into the first electric power generation state when a high-load apparatus is stopped. The high-load apparatus is one of a plurality of electrical loads that are coupled to the first electricity storage and include the high-load apparatus and a low-load apparatus, and is higher in power consumption than the low-load apparatus. The switch controller is configured to control the switch into the cutoff state and the generator controller controls the generator into the second electric power generation state when the high-load apparatus is in operation.

An aspect of the technology provides a vehicle power supply apparatus that includes: a generator coupled to an engine; a first electricity storage able to be coupled to the generator; a second electricity storage able to be coupled to the generator in parallel to the first electricity storage; a switch configured to switch from electric conduction between the generator and the second electricity storage to cutoff between the generator and the second electricity storage and vice versa; and circuitry configured to control the generator into a first electric power generation state and a second electric power generation state that is higher in electric power generation voltage than the first electric power generation state, control the switch into an electrically-conductive state and a cutoff state, control the switch into the electrically-conductive state and control the generator into the first electric power generation state when a high-load apparatus is stopped, in which the high-load apparatus is one of a plurality of electrical loads that are coupled to the first electricity storage and include the high-load apparatus and a low-load apparatus, and is higher in power consumption than the low-load apparatus, and control the switch into the cutoff state and control the generator into the second electric power generation state when the high-load apparatus is in operation.

DETAILED DESCRIPTION

Figure 1:
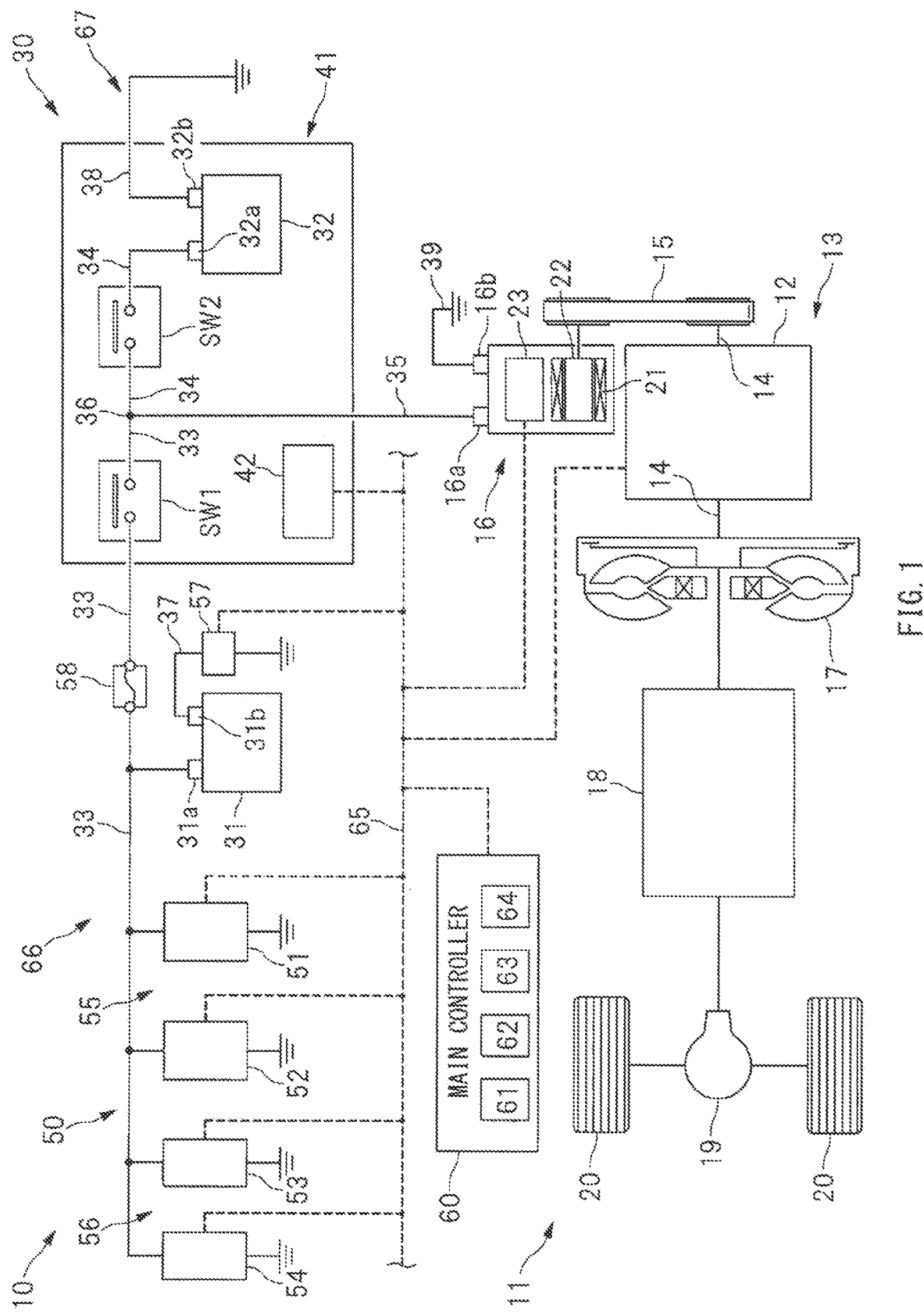
FIG. 1 is a diagram schematically illustrating an example of a configuration of a vehicle provided with a vehicle power supply apparatus according to one implementation of the technology.

In the following, some implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

In general, a vehicle power supply apparatus has electrical loads including those that are large in power consumption, such as a headlamp or a wiper device. In order to allow such electrical loads to function properly, it is desirable that an electric power generation voltage of a generator be increased. However, simply increasing the electric power generation voltage of the generator leads to an increase in a charge current to be applied to an electricity storage such as a lithium-ion battery, which in turn leads to an increase in a load to be imposed on an engine by the generator. In other words, increasing the engine load becomes a factor that increases fuel consumption. What is therefore desired is to allow the electrical loads to function properly while suppressing the increase in the engine load.

It is desirable to provide a vehicle power supply apparatus that allows an electrical load to function property while suppressing an increase in an engine load.

FIG. 1 schematically illustrates an example of a configuration of a vehicle 11 provided with a vehicle power supply apparatus 10 according to an example implementation of the technology. Referring to FIG. 1, the vehicle 11 includes the vehicle power supply apparatus 10 according to an example implementation of the technology. The vehicle 11 may be mounted with a power unit 13. The power unit 13 may include an engine 12 that serves as a power source. The engine 12 may include a crankshaft 14 that is mechanically coupled to a starter generator 16 via a belt mechanism 15. In one implementation, the starter generator 16 may serve as a "generator" or a "generator motor". The engine 12 may also be coupled to a transmission mechanism 18 via a torque converter 17. The transmission mechanism 18 may be coupled to wheels 20 via a member such as a differential mechanism 19.

The starter generator 16 coupled to the engine 12 may be a so-called integrated starter generator (ISG) that serves both as a generator and a motor. The starter generator 16 may serve not only as the generator to be driven by the crankshaft 14 but may also serve as the motor that revolves the crankshaft 14. For example, the starter generator 16 may be controlled into a powering state as the motor when restarting the engine 12 upon an idling stop control, or when performing assist driving of the engine 12 upon start and acceleration.

The starter generator 16 may include a stator 21 having a stator coil and a rotor 22 having a field coil. The starter generator 16 may further include an ISG controller 23 in order to control a conducting state of each of the stator coil and the field coil. The ISG controller 23 may include components such as an inverter, a regulator, and a microcomputer. The ISG controller 23 may control the conducting state of each of the field coil and the stator coil, thus controlling an electric power generation voltage, electric power generation torque, powering torque, and/or any other factor, of the starter generator 16.

[Power Supply Circuit]

Figure 2:
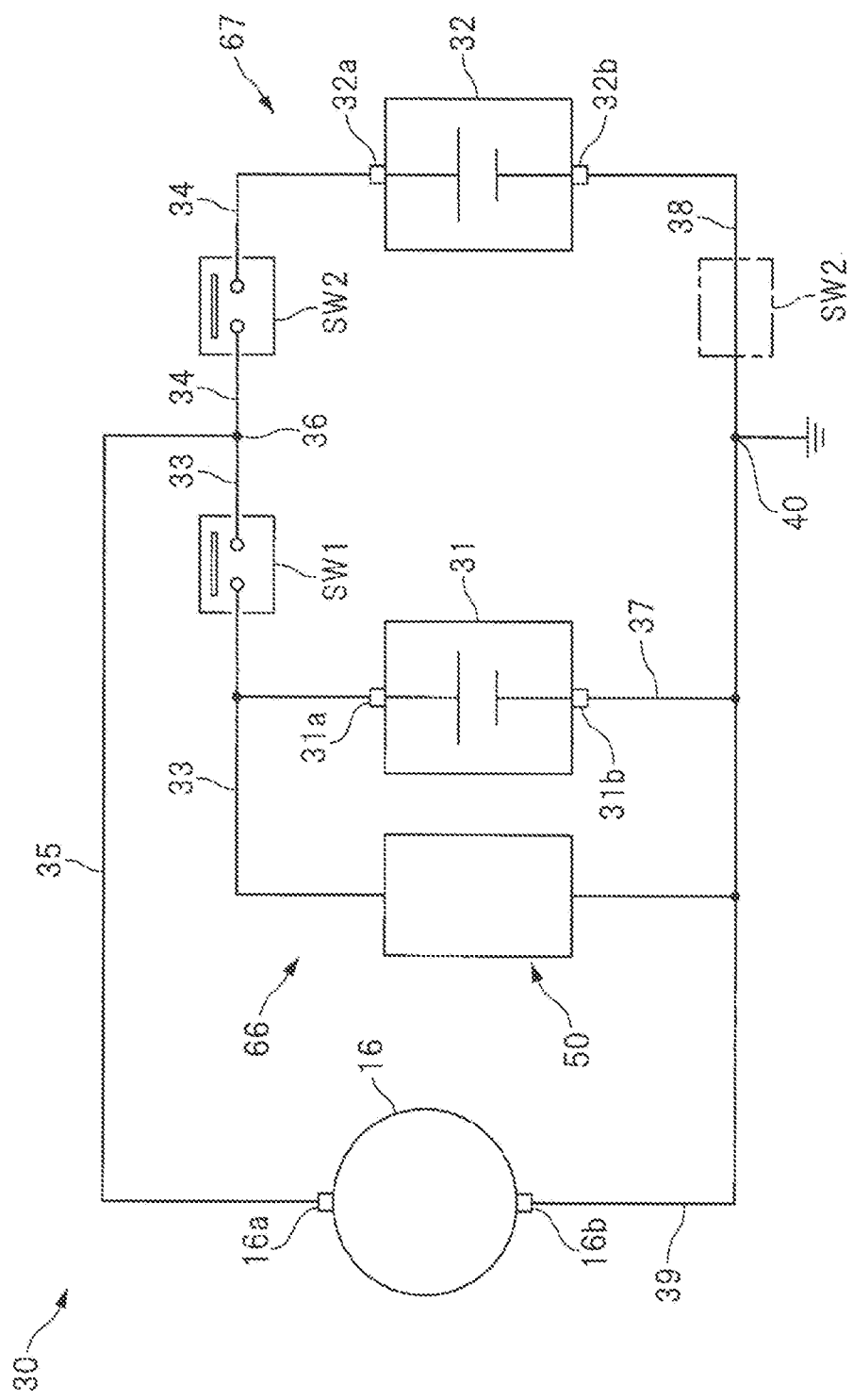
FIG. 2 is a circuit diagram illustrating an example of a power supply circuit.

A description is given of a power supply circuit 30 included in the vehicle power supply apparatus 10. FIG. 2 is a circuit diagram illustrating an example of the power supply circuit 30. Referring to FIG. 2, the power supply circuit 30 may include a lead-acid battery 31 and a lithium-ion battery 32. In one implementation, the lead-acid battery 31 may serve as a "first electricity storage". In one implementation, the lithium-ion battery 32 may serve as a "second electricity storage". The lead-acid battery 31 may be configured to be electrically coupled to the starter generator 16. The lithium-ion battery 32 may be configured to be electrically coupled to the starter generator 16 in parallel to the lead-acid battery 31. The lithium-ion battery 32 may have a terminal voltage that is designed higher than a terminal voltage of the lead-acid battery 31 in order to actively discharge the lithium-ion battery 32. Further, the lithium-ion battery 32 may have internal resistance that is designed smaller than internal resistance of the lead-acid battery 31 in order to actively charge and discharge the lithium-ion battery 32.

The lead-acid battery 31 may include a positive terminal 31a coupled to a positive line 33. The lithium-ion battery 32 may include a positive terminal 32a coupled to a positive line 34. The starter generator 16 may include a positive terminal 16a coupled to a positive line 35. These positive lines 33 to 35 may be coupled to one another via a node 36. The lead-acid battery 31 may include a negative terminal 31b coupled to a negative line 37. The lithium-ion battery 32 may include a negative terminal 32b coupled to a negative line 38. The starter generator 16 may include a negative terminal 16b coupled to a negative line 39. These negative lines 37 to 39 each may be coupled to one another via a reference potential point 40.

The positive line 33 of the lead-acid battery 31 may be provided with a switch SW1 that is switchable between an electrically-conductive state and a cutoff state. In other words, the switch SW1 switches from electric conduction between the starter generator 16 and the lead-acid battery 31 to cutoff between the starter generator 16 and the lead-acid battery 31 and vice versa, i.e., switches from the cutoff between the starter generator 16 and the lead-acid battery 31 to the electric conduction between the starter generator 16 and the lead-acid battery 31. In one implementation, the switch SW1 may serve as a "first switch". Controlling the switch SW1 into the electrically-conductive state may allow the starter generator 16 and the lead-acid battery 31 to be coupled to each other, whereas controlling the switch SW1 into the cutoff state may allow the starter generator 16 and the lead-acid battery 31 to be isolated from each other. The positive line 34 of the lithium-ion battery 32 may be provided with a switch SW2 that is switchable between an electrically-conductive state and a cutoff state. In other words, the switch SW2 switches from electric conduction between the starter generator 16 and the lithium-ion battery 32 to cutoff between the starter generator 16 and the lithium-ion battery 32 and vice versa, i.e., switches from the cutoff between the starter generator 16 and the lithium-ion battery 32 to the electric conduction between the starter generator 16 and the lithium-ion battery 32. In one implementation, the switch SW2 may serve as a "switch" or a "second switch". Controlling the switch SW2 into the electrically-conductive state may allow the starter generator 16 and the lithium-ion battery 32 to be coupled to each other, whereas controlling the switch SW2 into the cutoff state may allow the starter generator 16 and the lithium-ion battery 32 to be isolated from each other.

The switch SW1 and the switch SW2 each may be configured by a semiconductor element such as, but not limited to, a metal-oxide-semiconductor field-effect transistor (MOSFET). In an alternative implementation, the switch SW1 and the switch SW2 each may be a mechanical switch that opens and closes a contact by means of electromagnetic force, for example. Note that the switch SW1 and the switch SW2 each encompass a relay or a contactor as well.

Referring to FIG. 1, the power supply circuit 30 may include a battery module 41. The lithium-ion battery 32 and the switches SW1 and SW2 may be incorporated into the battery module 41. The battery module 41 may further include a battery controller 42. The battery controller 42 may include a microcomputer, for example. The battery controller 42 may have a monitoring function and a control function. Non-limiting examples of the monitoring function may include monitoring of a state of charge SOC, charge and discharge currents, the terminal voltage, a cell temperature, and the internal resistance of the lithium-ion battery 32. Non-limiting examples of the control function may include controlling each of the switches SW1 and SW2. Note that the state of charge SOC refers to a ratio of an electricity storage amount of a battery to a designed capacity of the battery.

The positive line 33 of the lead-acid battery 31 may be coupled to an electrical load group 50 including a plurality of electrical loads. Non-limiting examples of the electrical load that configures the electrical load group 50 may include: a wiper device 51 that wipes a windshield; a headlamp 52 that apply light toward the front of the vehicle 11; an instrument panel 53 that displays various pieces of information; and a navigation system 54 that display various pieces of information including map information. Among the electrical loads exemplified above, the wiper device 51 and the headlamp 52 each may be a high-load device 55 whose power consumption exceeds a predetermined electric power threshold. In one implementation, the high-load device 55 may serve as a "high-load apparatus". In order to allow such high-load devices 55 to function properly, it is desirable that a voltage to be applied to the high-load devices 55 be so increased as to be equal to or higher than a predetermined voltage. Further, among the electrical loads exemplified above, the instrument panel 53 and the navigation system 54 each may be a low-load device 56 whose power consumption falls below the predetermined electric power threshold. In one implementation, the low-load device 56 may serve as a "low-load apparatus". Accordingly, the vehicle power supply apparatus 10 includes, as the electrical loads, the low-load device 56 and the high-load device 55 that is higher in the power consumption than the low-load device 56. Note that the high-load device 55 and the low-load device 56 are not limited to the devices described above.

Although unillustrated, the positive line 33 of the lead-acid battery 31 may also be coupled to various controllers as the electrical loads, including the ISG controller 23, the battery controller 42, and a later-described main controller 60. In an example implementation, the various controllers including the ISG controller 23, the battery controller 42, and the main controller 60 each may also function as the low-load device 56 having the low power consumption. Further, the negative line 37 of the lead-acid battery 31 may be provided with a battery sensor 57. The battery sensor 57 may have a detection function. Non-limiting examples of the detection function may include detection of a state of charge SOC, charge and discharge currents, and a terminal voltage of the lead-acid battery 31. The positive line 33 may also be provided with a fuse 58 that protects the electrical load group 50 and other devices.

[Control System of Vehicle Power Supply Apparatus]

The vehicle power supply apparatus 10 may be provided with the main controller 60 as illustrated in FIG. 1. The main controller 60 may include a microcomputer, for example. The main controller 60 may include functional units, including a generator controller 62 that controls the starter generator 16 and a switch controller 63 that controls the switches SW1 and SW2. The main controller 60 may also include functional units such as an engine controller 61 that controls the engine 12 or an idling stop controller 64 that executes the idling stop control. The main controller 60 and other controllers, including the ISG controller 23 and the battery controller 42, may be so coupled to one another as to be able to perform a communication mutually and freely via an in-vehicle network 65. Non-limiting examples of the in-vehicle network 65 may include a controller area network (CAN) and a local interconnect network (LIN).

As described later in greater detail, the functional units of the main controller 60 may control devices such as the engine 12, the starter generator 16, or the switches SW1 and SW2, on the basis of pieces of information obtained from the various controllers and sensors. For example, the generator controller 62 of the main controller 60 may output a control signal to the ISG controller 23 to thereby control a factor such as the electric power generation voltage or the electric power generation torque of the starter generator 16. Further, for example, the switch controller 63 of the main controller 60 may output a control signal to the battery controller 42 to thereby control any of the switches SW1 and SW2 into any state such as the electrically-conductive state or the cutoff state.

The main controller 60 may include the idling stop controller 64 as described previously. The idling stop controller 64 may have a function of controlling the engine 12, the starter generator 16, or both, in order to execute the idling stop control that automatically stops the engine 12 and restarts the engine 12 automatically. The idling stop controller 64 may stop the engine 12 when a predetermined stopping condition is satisfied during an operation of the engine 12, and may restart the engine 12 when a predetermined starting condition is satisfied during a stop of the engine 12. In an example implementation, the stopping condition of the engine 12 may be a condition where a speed of the vehicle 11 falls below a predetermined value and a brake pedal is pressed down. The starting condition of the engine 12 in an example implementation may be a condition where the brake pedal that has been pressed down is released, or where an accelerator pedal is pressed down. It is to be noted that the starter generator 16 so revolves the engine 12 as to start the engine 12 upon the restarting of the engine 12 based on the idling stop control.

[Electric Power Supply Situations]

Figure 3:
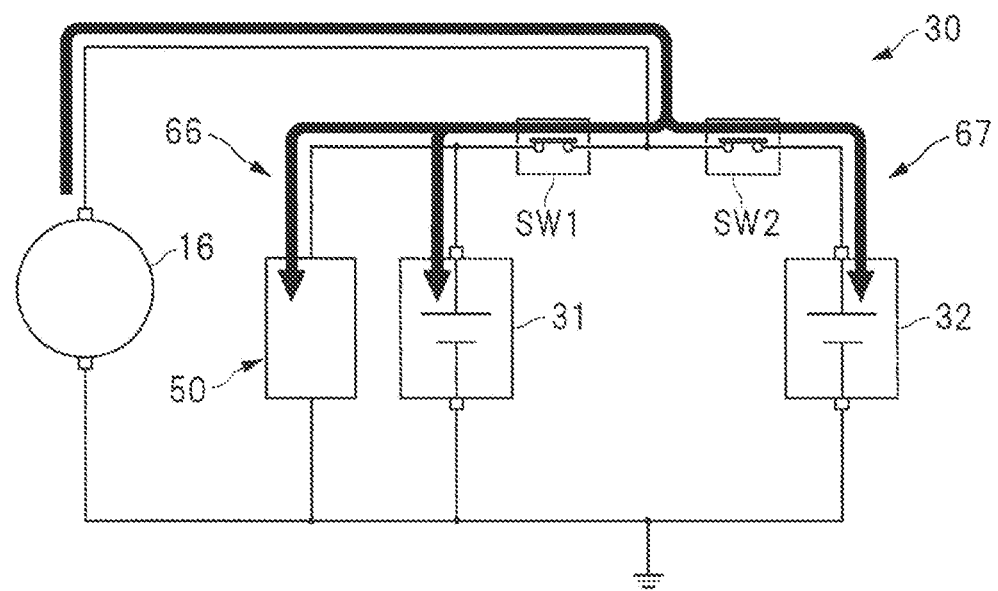
FIG. 3 is a diagram illustrating an example of an electric power supply situation when a starter generator is controlled into a combustion power generation state.
Figure 4:
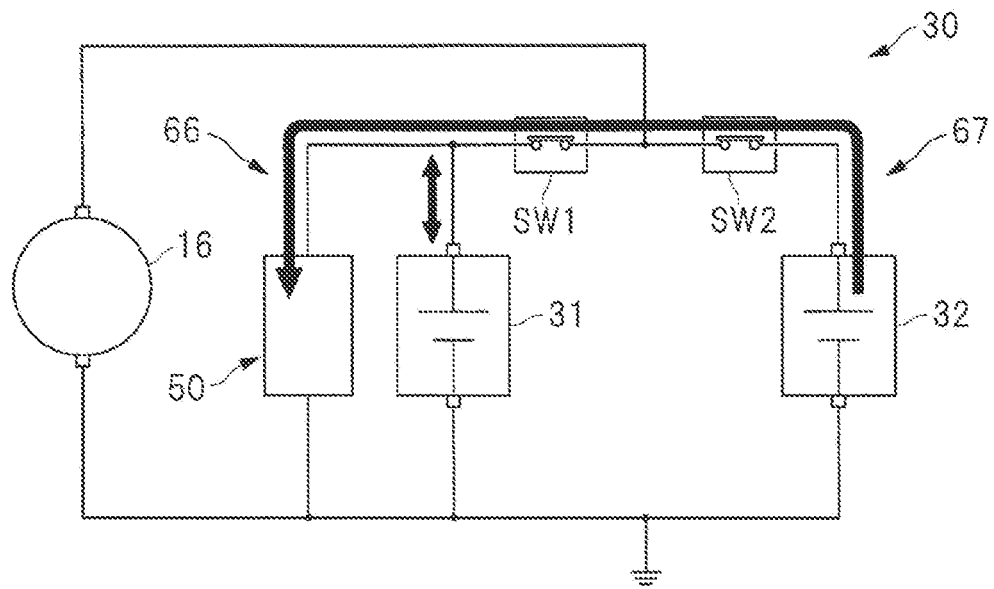
FIG. 4 is a diagram illustrating an example of an electric power supply situation when the starter generator is controlled into a power generation suspended state.
Figure 5:
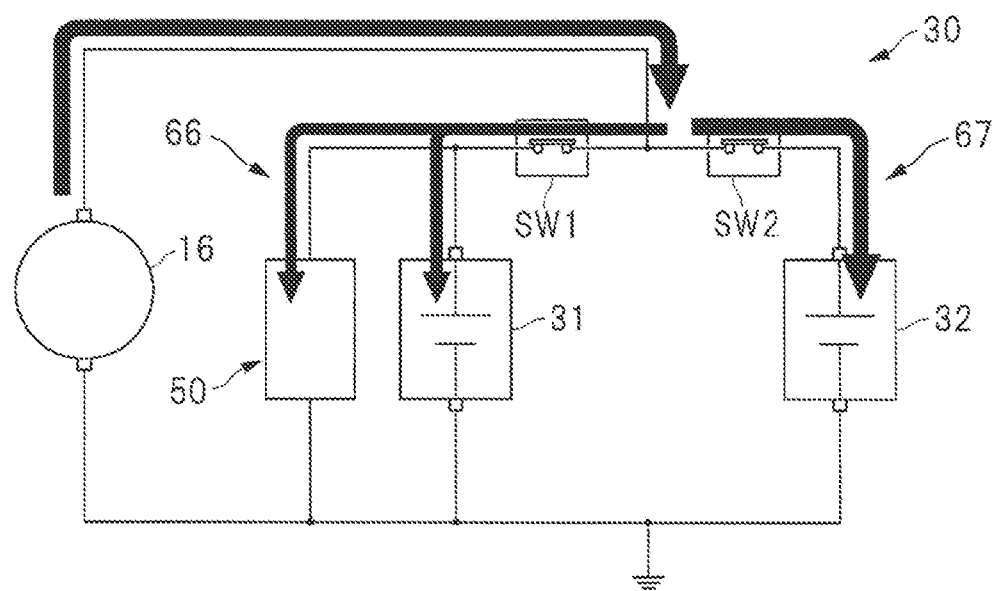
FIG. 5 is a diagram illustrating an example of an electric power supply situation when the starter generator is controlled into a regenerative power generation state.
Figure 6:
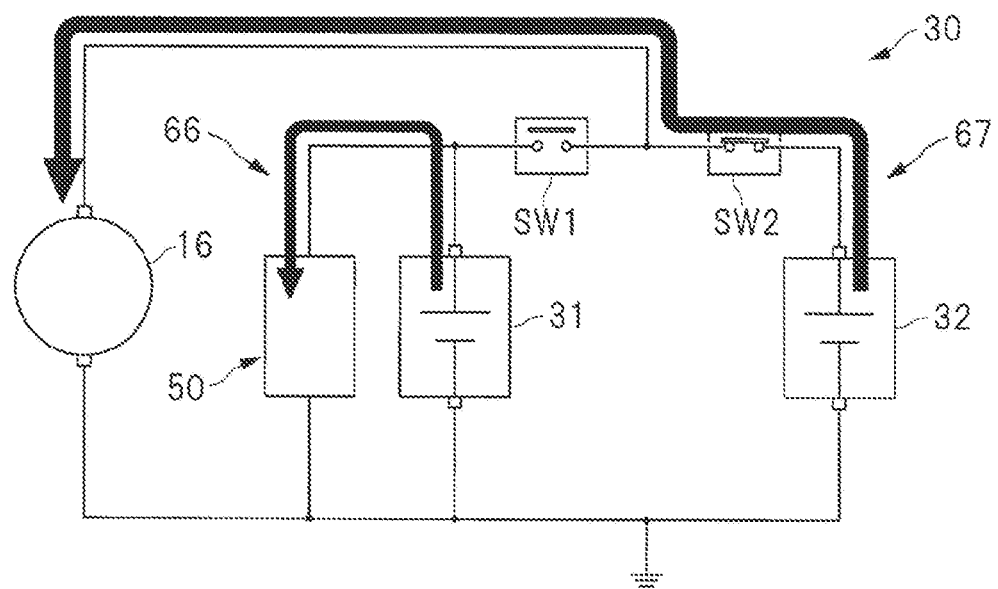
FIG. 6 is a diagram illustrating an example of an electric power supply situation when the starter generator is controlled into a powering state.

A description is given of an electric power supply situation associated with a control such as an electric power generation control or a powering control of the starter generator 16. FIG. 3 illustrates an example of an electric power supply situation when the starter generator 16 is controlled into a combustion power generation state. FIG. 4 illustrates an example of an electric power supply situation when the starter generator 16 is controlled into a power generation suspended state. FIG. 5 illustrates an example of an electric power supply situation when the starter generator 16 is controlled into a regenerative power generation state. FIG. 6 illustrates an example of an electric power supply situation when the starter generator 16 is controlled into a powering state.

Referring to FIG. 3, the starter generator 16 may be controlled into the combustion power generation state when an amount of charge of the lithium-ion battery 32 is low. For example, in a case where the state of charge SOC of the lithium-ion battery 32 falls below a predetermined lower limit, the starter generator 16 may be controlled into the combustion power generation state, in order to charge the lithium-ion battery 32 for enhancement of the state of charge SOC. When the starter generator 16 is controlled into the combustion power generation state, the electric power generation voltage of the starter generator 16 may be raised above the terminal voltage of the lithium-ion battery 32. This causes the starter generator 16 to supply generated electric power to components including the lithium-ion battery 32, the electrical load group 50, and the lead-acid battery 31, as indicated by black arrows in FIG. 3. In an example implementation, the combustion power generation state of the starter generator 16 refers to a state in which the starter generator 16 is so driven by the engine 12 as to generate electricity.

Referring to FIG. 4, the starter generator 16 may be controlled into the power generation suspended state when the amount of charge of the lithium-ion battery 32 is sufficient. For example, in a case where the state of charge SOC of the lithium-ion battery 32 exceeds a predetermined upper limit, a supply of electric power from the lithium-ion battery 32 to the electrical load group 50 is possible; accordingly, the starter generator 16 may be controlled into the power generation suspended state. When the starter generator 16 is controlled into the power generation suspended state, the electric power generation voltage of the starter generator 16 may be lowered below the terminal voltage of the lithium-ion battery 32. This causes the electric power to be supplied from the lithium-ion battery 32 to components including the electrical load group 50, as indicated by a black arrow in FIG. 4. Hence, it becomes possible to suppress or stop the electric power generation of the starter generator 16, thus allowing for reduction in the engine load.

As described previously, the main controller 60 may control the starter generator 16 into the state such as the combustion power generation state or the power generation suspended state on the basis of the state of charge SOC. Upon deceleration traveling, it is advantageous to collect large kinetic energy for enhancement of a fuel consumption performance. Accordingly, upon the deceleration traveling, the starter generator 16 may be controlled into the regenerative power generation state to increase the electric power generation voltage of the starter generator 16. For example, the electric power generation voltage of the starter generator 16 may be increased within a range not exceeding a withstand voltage of each of components such as the lead-acid battery 31, the lithium-ion battery 32, or the electrical load group 50. This enables a large amount of current to be supplied from the starter generator 16 to the lead-acid battery 31 and the lithium-ion battery 32 as indicated by black arrows in FIG. 5. In other words, this increases the electric power derived from the electric power generation performed by the starter generator 16, making it possible to actively convert the kinetic energy of the vehicle 11 into electric energy and collect the converted electric energy. Hence, it becomes possible to enhance an energy efficiency of the vehicle 11 and thereby to improve the fuel consumption performance of the vehicle 11. Note that much of a generated current may be supplied to the lithium-ion battery 32 owing to the internal resistance of the lithium-ion battery 32 which is smaller than the internal resistance of the lead-acid battery 31.

Referring to FIGS. 3 to 5, when the starter generator 16 is controlled into the combustion power generation state, the regenerative power generation state, or the power generation suspended state, the switch SW1 and the switch SW2 may be held in the electrically-conductive state. In other words, the vehicle power supply apparatus 10 makes it possible to control the charge and the discharge of the lithium-ion battery 32 simply by controlling the electric power generation voltage of the starter generator 16, without controlling the switching between the switch SW1 and the switch SW2. Thus, it is possible to easily control the charge and the discharge of the lithium-ion battery 32, and to improve durability of the switch SW1 and the switch SW2.

Referring to FIG. 6, the switch SW1 may be controlled into the cutoff state when the starter generator 16 is controlled into the powering state. For example, the switch SW1 may be controlled into the cutoff state from the electrically-conductive state when the starter generator 16 so revolves the engine 12 as to start the engine 12, or when the starter generator 16 performs the assist driving of the engine 12. Switching the switch SW1 to the cutoff state in this manner causes a power supply circuit 66, including the lead-acid battery 31 and the electrical load group 50, and a power supply circuit 67, including the lithium-ion battery 32 and the starter generator 16, to be isolated from each other. Thus, as indicated by black arrows in FIG. 6, it is possible to supply the electric power to the electrical load group 50 from the lead-acid battery 31 even in a situation where a consumption current of the starter generator 16 increases. This makes it possible to prevent the electrical load group 50 from being influenced by an instantaneous voltage drop, i.e., prevent an instantaneous voltage drop of the electrical load group 50, and thereby to allow the electrical load group 50 to function properly.

[Starter Generator Control and Switch Control]

Figure 7:
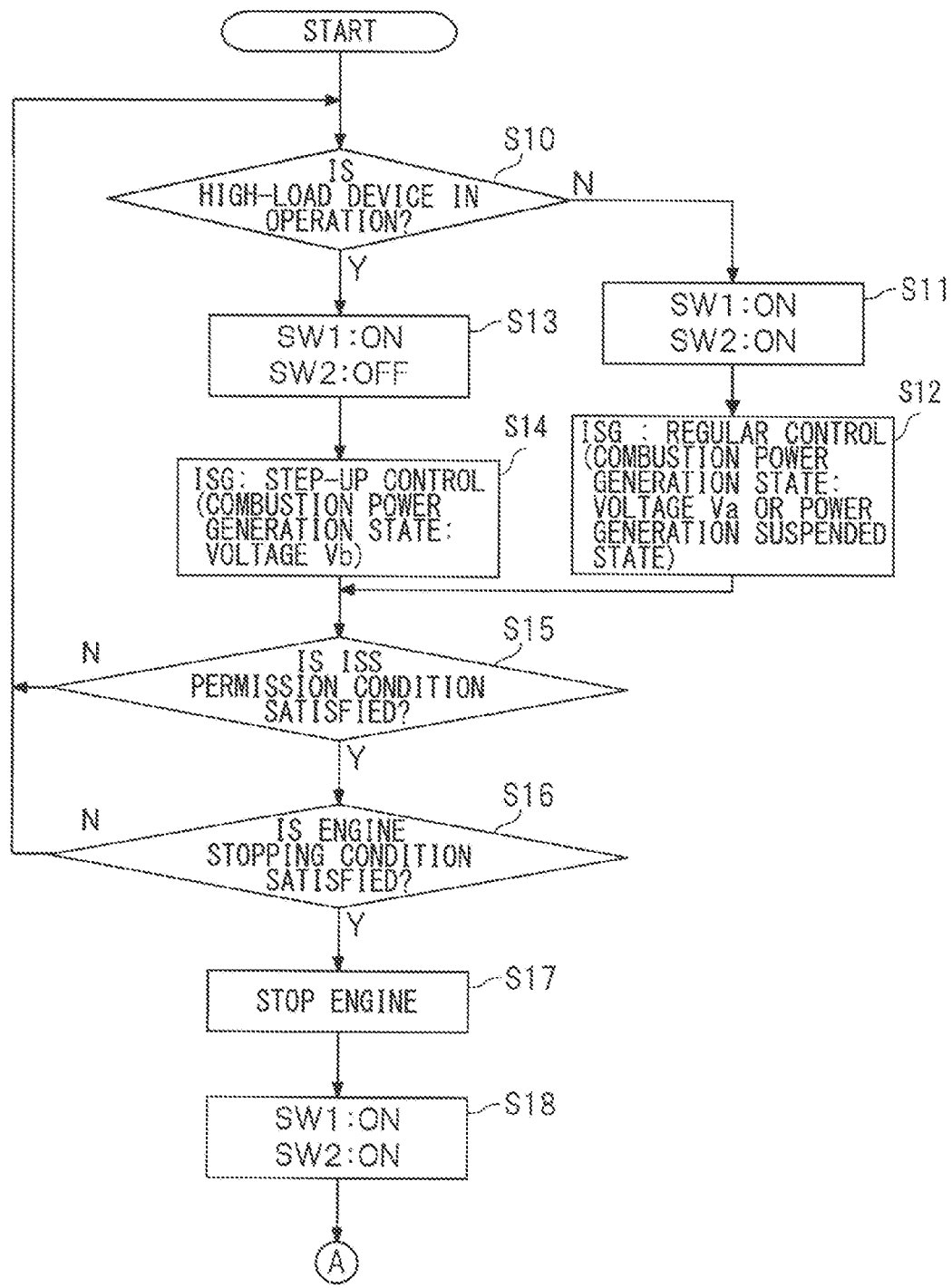
FIG. 7 is a flowchart illustrating an example of a procedure, executed at every predetermined cycle, for controlling of the starter generator and switches.
Figure 8:
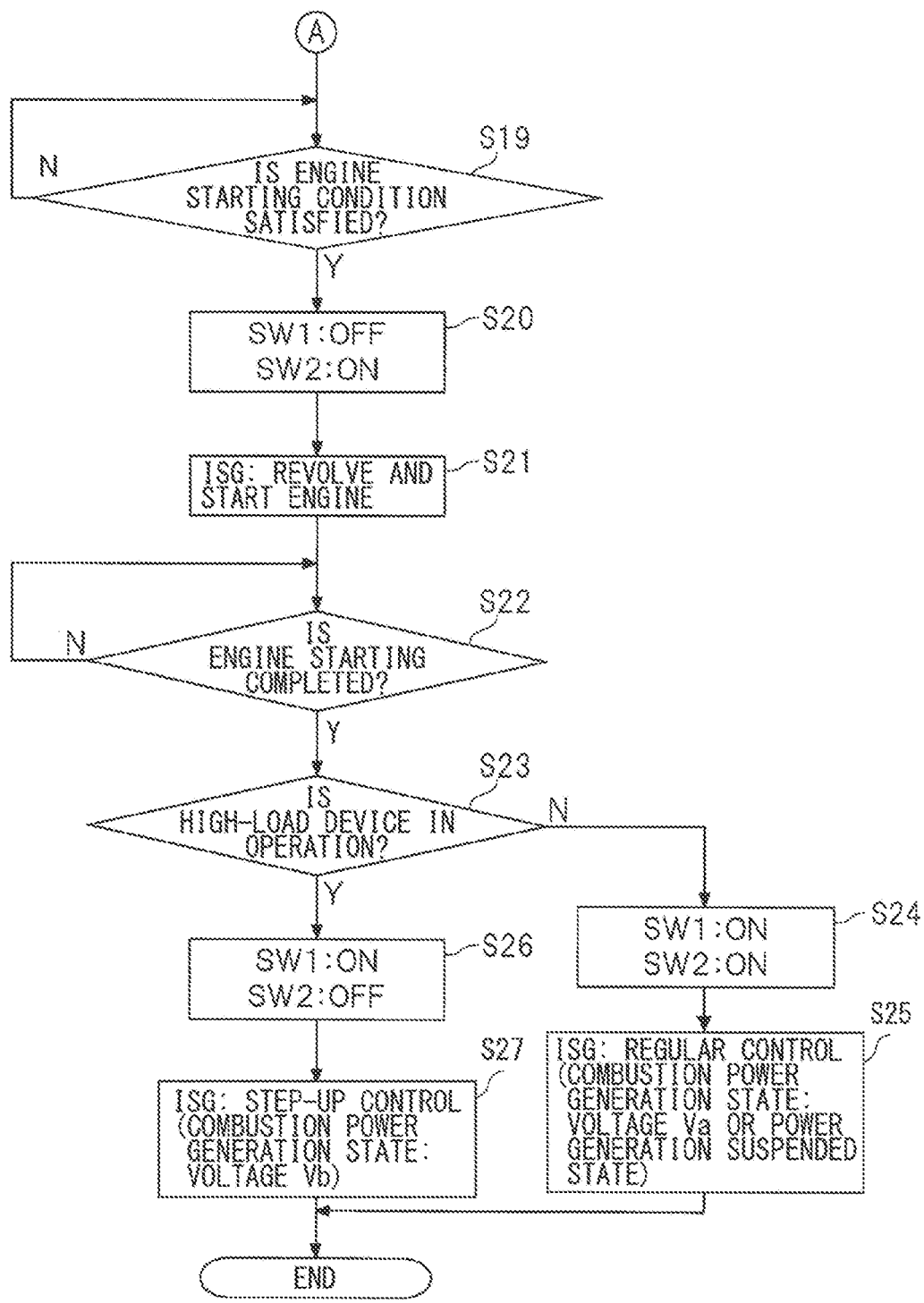
FIG. 8 is a flowchart illustrating an example of the procedure, executed at every predetermined cycle, for controlling of the starter generator and the switches.
Figure 9A:
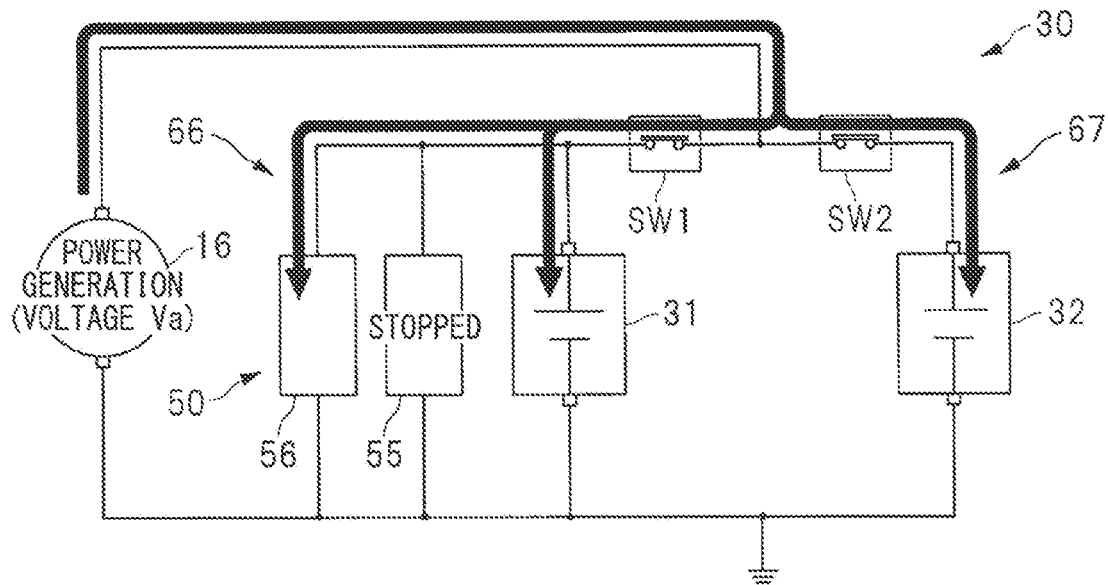
FIGS. 9A and 9B each illustrate an example of an electric power supply situation in the course of controlling the starter generator and the switches.
Figure 9B:
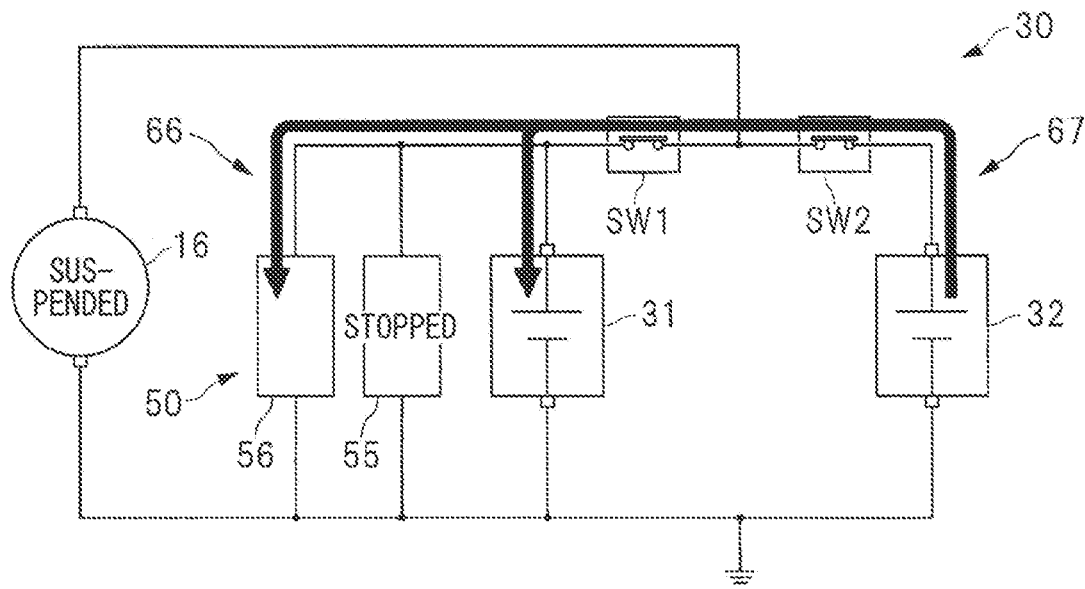

A description is given next of a procedure for controlling the starter generator 16 and the switches SW1 and SW2 performed by the vehicle power supply apparatus 10. FIGS. 7 and 8 are each a flowchart illustrating an example of the procedure for controlling of the starter generator 16 and the switches SW1 and SW2. The procedure may be executed at every predetermined cycle. Note that the flowcharts illustrated in FIGS. 7 and 8 are coupled to each other at parts denoted by respective reference signs A and B. FIGS. 9A to 12 each illustrate an example of an electric power supply situation in the course of controlling the starter generator 16 and the switches SW1 and SW2. Note that "ON" and "OFF" illustrated in FIGS. 7 and 8 respectively denote the electrically-conductive state and the cutoff state of the corresponding switch SW1 or SW2. Further, in FIGS. 7 and 8, "ISG" and "ISS" respectively denote the starter generator 16 and the idling stop.

Referring to FIG. 7, in step S10, a determination may be made as to whether the high-load device 55 such as the wiper device 51 or the headlamp 52 is in operation. A flow may proceed to step S11 when the high-load device 55 is determined in step S10 as not being in operation, i.e., determined as being stopped (step S10: N). In step S11, the switch SW1 and the switch SW2 may be both controlled into the electrically-conductive state. Thereafter, in step S12, a regular control of the starter generator 16 may be executed. In an example implementation, the regular control of the starter generator 16 refers to a control that is executed when the high-load device 55 is stopped. For example, referring to FIG. 9A, the starter generator 16 may be so controlled into the combustion power generation state as to be at a low electric power generation voltage Va when the state of charge SOC of the lithium-ion battery 32 is low upon the regular control of the starter generator 16. In one implementation, the combustion power generation state involving the low electric power generation voltage Va may serve as a "first electric power generation state". In an example implementation, the electric power generation voltage Va may be 13 volts. For example, referring to FIG. 9B, the starter generator 16 may be controlled into the power generation suspended state when the state of charge SOC of the lithium-ion battery 32 is high during the regular control of the starter generator 16.

The flow may proceed to step S13 when the high-load device 55 is determined in step S10 as being in operation (step S10: Y). In step S13, the switch SW1 may be controlled into the electrically-conductive state, and the switch SW2 may be controlled into the cutoff state. Thereafter, in step S14, a step-up control of the starter generator 16 may be executed. In an example implementation, the step-up control of the starter generator 16 refers to a control that is executed when the high-load device 55 is in operation. For example, referring to FIG. 10, the starter generator 16 may be so controlled into the combustion power generation state as to be at a high electric power generation voltage Vb upon the step-up control of the starter generator 16. In one implementation, the combustion power generation state involving the high electric power generation voltage Vb may serve as a "second electric power generation state". In an example implementation, the electric power generation voltage Vb may be 14 volts.

Executing the step-up control to thereby increase the electric power generation voltage of the starter generator 16 in this way ensures the voltage to be applied to the high-load devices 55, making it possible to allow the high-load devices 55 to operate properly. Further, the switch SW2 is controlled into the cutoff state to allow the starter generator 16 and the lithium-ion battery 32 to be isolated from each other when increasing the electric power generation voltage of the starter generator 16. This prevents a current from flowing to the lithium-ion battery 32 from the starter generator 16 even when the electric power generation voltage of the starter generator 16 is increased, making it possible to suppress the electric power derived from the electric power generation performed by the starter generator 16. In other words, it is possible to reduce the load to be imposed on the engine 12 that drives the starter generator 16, and to suppress the fuel consumption of the engine 12.

If the electric power generation voltage of the starter generator 16 is increased in an example case where the internal resistance of the lithium-ion battery 32 is smaller than the internal resistance of the lead-acid battery 31, a large amount of current would flow from the starter generator 16 to the lithium-ion battery 32. In other words, simply increasing the electric power generation voltage of the starter generator 16 leads to a sharp increase in the electric power derived from the electric power generation of the starter generator 16 associated with fast charging of the lithium-ion battery 32, which in turn leads to a sharp increase in the load to be imposed on the engine 12 that drives the starter generator 16. In contrast, in an example implementation, the switch SW2 is cut off when increasing the electric power generation voltage of the starter generator 16, making it possible to isolate the lithium-ion battery 32 from the starter generator 16, and to increase the electric power generation voltage without sharply increasing the engine load.

[Idling Stop Control]

Figure 10:
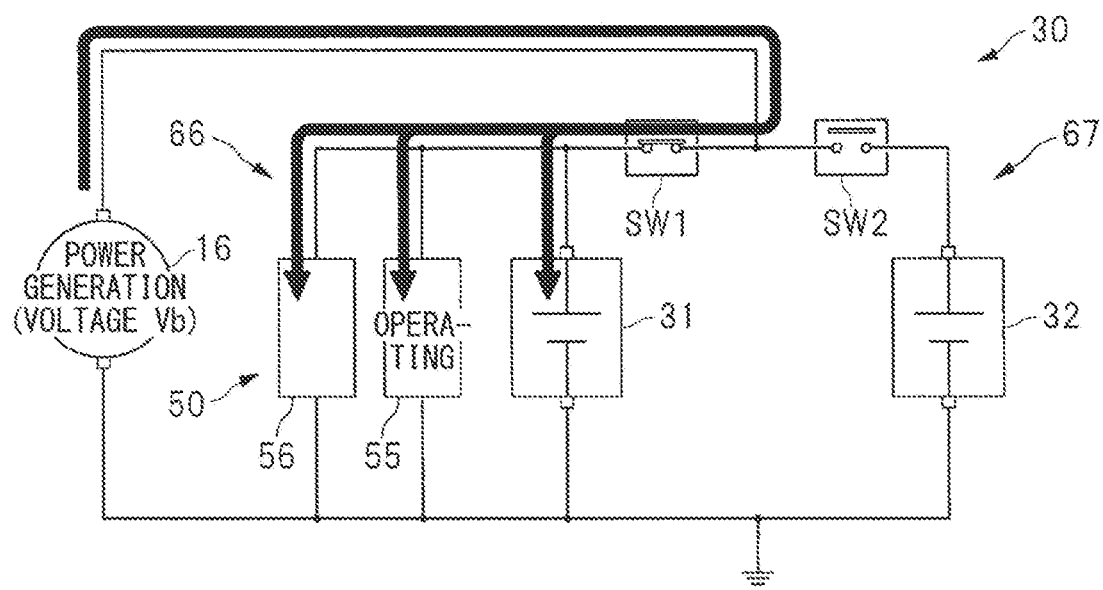
FIG. 10 illustrates an example of an electric power supply situation in the course of controlling the starter generator and the switches.

As described previously, the starter generator 16 may be controlled into the powering state by means of the electric power derived from the lithium-ion battery 32, upon the restarting of the engine 12 based on the idling stop control. In this regard, it is to be noted that the switch SW2 has been controlled into the cutoff state and the lithium-ion battery 32 has been isolated from the starter generator 16 accordingly when the high-load device 55 operates as illustrated in FIG. 10. To address this, the vehicle power supply apparatus 10 according to an example implementation may allow for the execution of the idling stop control that involves the restarting of the engine 12 by coupling the lithium-ion battery 32 to the starter generator 16 on the basis of the following example procedure.

Referring to FIG. 7, in step S15, a determination may be made as to whether a condition for permitting the idling stop control is satisfied. For example, the permission condition of the idling stop control may be determined in step S15 as being satisfied in a case where: the starter generator 16 and the lithium-ion battery 32 both function properly; and the state of charge SOC of the lithium-ion battery 32 exceeds a predetermined value. In an example implementation, the predetermined value may be 20%. The flow may proceed to step S16 when the permission condition of the idling stop control is determined in step S15 as being satisfied (S15: Y). In step S16, a determination may be made as to whether the stopping condition of the engine 12 is satisfied. For example, the engine stopping condition may be determined in step S16 as being satisfied in a case where: the speed of the vehicle 11 falls below the predetermined value; and the brake pedal is pressed down.

Figure 11:
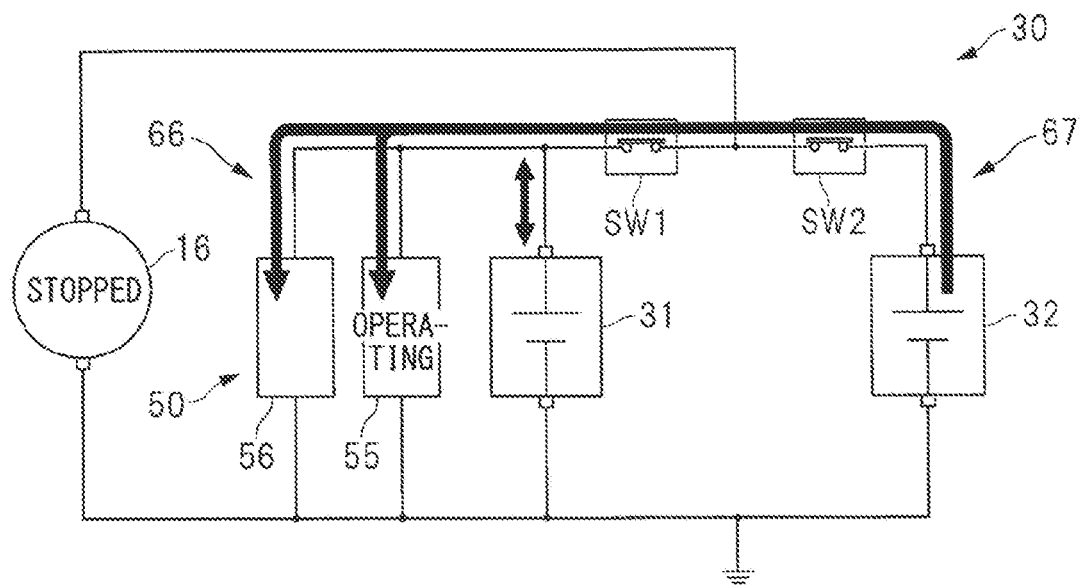
FIG. 11 illustrates an example of an electric power supply situation in the course of controlling the starter generator and the switches.

The flow may proceed to step S17 when the engine stopping condition is determined in step S16 as being satisfied (S16: Y). In step S17, the engine 12 may be stopped, following which the flow may proceed to step S18. In step S18, both of the switch SW1 and the switch SW2 may be controlled into the electrically-conductive state. Referring to FIG. 11, the starter generator 16 stops together with the engine 12 in the idling stop control. However, the switch SW1 and the switch SW2 are both controlled into the electrically-conductive state upon the idling stop control, making it possible to continue the supply of electric power to the electrical load group 50 from the lithium-ion battery 32, and thereby to allow the electrical load group 50 to function properly.

When the permission condition of the idling stop control is determined in step S15 as not being satisfied (S15: N), the flow may return to step S10 without stopping the engine 12. For example, the permission condition of the idling stop control may be determined in step S15 as not being satisfied in a case where an abnormality is found in the starter generator 16, the lithium-ion battery 32, or both, or in a case where the state of charge SOC of the lithium-ion battery 32 is equal to or less than the predetermined value, such as equal to or less than 20%. The flow may also return to step S10 without stopping the engine 12 when the engine stopping condition is determined in step S16 as not being satisfied (S16: N). For example, the engine stopping condition may be determined as not being satisfied in a case where the speed of the vehicle 11 exceeds the predetermined value, or in a case where the brake pedal is not pressed down.

Figure 12:
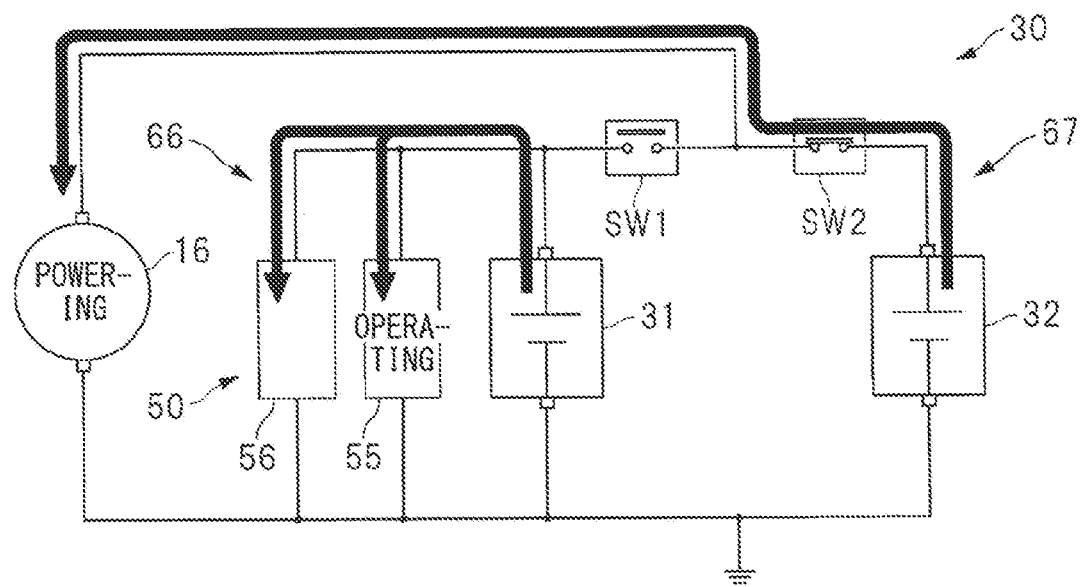
FIG. 12 illustrates an example of an electric power supply situation in the course of controlling the starter generator and the switches.

Referring to FIG. 8, the flow may proceed to step S19 once the idling stop is executed. In step S19, a determination may be made as to whether the starting condition of the engine 12 is satisfied. For example, the engine starting condition may be determined in step S19 as being satisfied in a case where the brake pedal that has been pressed down is released, or in a case where the accelerator pedal is pressed down. The flow may proceed to step S20 when the engine starting condition is determined in step S19 as being satisfied (S19: Y). In step S20, the switch SW1 may be controlled into the cutoff state, and the switch SW2 may be controlled into the electrically-conductive state. Thereafter, the flow may proceed to step S21 in which the starter generator 16 so revolves the engine 12 as to start the engine 12. Referring to FIG. 12, the switch SW1 may be controlled into the cutoff state when starting the engine 12, making it possible to prevent the electrical load group 50 from suffering the instantaneous voltage drop and to allow the electrical load group 50 to function properly, even in a situation where a large amount of current flows from the lithium-ion battery 32 to the starter generator 16.

Referring back to FIG. 8, the flow may proceed to step S22 once the revolving to start the engine 12 by means of the starter generator 16 is performed. In step S22, a determination may be made as to whether the starting of the engine 12 is completed. For example, the starting of the engine 12 is determined as being completed in a case where the number of revolutions of the engine 12 exceeds the predetermined number of revolutions, i.e., when the engine 12 is determined as being in a complete-combustion state. The flow may proceed to step S23 when the starting of the engine 12 is determined in step S22 as being completed (S22: Y). In step S23, a determination may be made again as to whether the high-load device 55 such as the wiper device 51 or the headlamp 52 is in operation.

The flow may proceed to step S24 when the high-load device 55 is determined in step S23 as not being in operation, i.e., determined as being stopped (step S23: N). In step S24, the switch SW1 and the switch SW2 may be both controlled into the electrically-conductive state. Thereafter, in step S25, the regular control of the starter generator 16 may be executed. The flow may proceed to step S26 when the high-load device 55 is determined in step S23 as being in operation (step S23: Y). In step S26, the switch SW1 may be controlled into the electrically-conductive state, and the switch SW2 may be controlled into the cutoff state. Thereafter, in step S27, the step-up control of the starter generator 16 may be executed.

According to the foregoing example implementation, when the high-load device 55 is stopped, the vehicle power supply apparatus 10 controls the switch SW2 into the electrically-conductive state, and controls the starter generator 16 into the combustion power generation state that involves the electric power generation voltage Va (e.g., controls the starter generator into the "first electric power generation state"). When the high-load device 55 is in operation, the vehicle power supply apparatus 10 controls the switch SW2 into the cutoff state, and controls the starter generator 16 into the combustion power generation state that involves the electric power generation voltage Vb that is higher than the electric power generation voltage Va (e.g., controls the starter generator into the "second electric power generation state"). Thus, even in a situation where the electric power generation voltage of the starter generator 16 is increased in order to allow the high-load devices 55 to function properly, it is possible to suppress the increase in the electric power derived from the electric power generation performed by the starter generator 16. In other words, it is possible to suppress the increase in the generated electric power while raising the electric power generation voltage. Hence, it is possible to allow the high-load device 55 to function properly while suppressing the increase in the engine load.

Although some implementations of the technology have been described in the foregoing with reference to the accompanying drawings, the technology is by no means limited to the implementations described above. Various changes and modifications may be made to any implementation without departing from the scope of the technology.

For example, in an example implementation described above, the vehicle power supply apparatus 10 includes the switch SW1; however, this is not limitative. In an alternative implementation, the switch SW1 may be eliminated from the vehicle power supply apparatus 10. Specifically, providing the switch SW2 in the vehicle power supply apparatus 10 suffices in light of suppressing the increase in the generated electric power while raising the electric power generation voltage of the starter generator 16, meaning that the switch SW1 may be eliminated from the vehicle power supply apparatus 10 in such an alternative implementation. Further, in an illustrated example implementation described above, the switch SW1 and the switch SW2 are incorporated in the battery module 41; however, this is not limitative. In an alternative implementation, the switch SW1, the switch SW2, or both may be provided outside the battery module 41. In an example implementation described above, the switch SW2 is provided on the positive line 34 of the lithium-ion battery 32; however, this is not limitative. In an alternative implementation, as indicated by an alternate long and short dashed line in FIG. 2, the switch SW2 may be provided on the negative line 38 of the lithium-ion battery 32.

For example, in an example implementation described above, the lead-acid battery 31 serves as the first electricity storage and the lithium-ion battery 32 serves as the second electricity storage; however, this is not limitative. In an alternative implementation, any other type of battery or capacitor may be adopted. Further, in an example implementation described above, the first electricity storage and the second electricity storage are different from each other in kind; however, this is not limitative. In an alternative implementation, the first electricity storage and the second electricity storage may be the same as each other in kind. Moreover, in an example implementation described above, the second electricity storage has the internal resistance that is smaller than the internal resistance of the first electricity storage; however, this is not limitative. In an alternative implementation, the second electricity storage may have the internal resistance that is larger than the internal resistance of the first electricity storage, or the internal resistance of the second electricity storage and the internal resistance of the first electricity storage may be the same as each other.

For example, in an example implementation described above, the starter generator 16 serves as the generator; however, this is not limitative. In an alternative implementation, an alternator may be adopted as the generator, or a motor generator may be adopted as the generator. Further, in an example implementation described above, the main controller 60 serves as the generator controller 62, the switch controller 63, and the idling stop controller 64; however, this is not limitative. In an alternative implementation, any other controller may serve as one or more of the generator controller 62, the switch controller 63, and the idling stop controller 64. In a yet alternative implementation, a plurality of controllers may serve as one or more of the generator controller 62, the switch controller 63, and the idling stop controller 64.

The main controller 60 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the main controller 60. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the main controller 60 illustrated in FIG. 1.

Although some implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle power supply apparatus comprising:
a generator coupled to an engine;
a first electricity storage configured to be coupled to the generator and electric devices in parallel;
a second electricity storage configured to be coupled to the generator in parallel to the first electricity storage via a switch, and configured to be a second terminal voltage greater than a first terminal voltage of the first electricity storage; and
a controller configured to supply electric power to at least the first electricity storage and the second electricity storage, by turning on the switch and generating electricity at a first voltage equal to or greater than the second terminal voltage of the second electricity storage,
wherein the controller is configured to supply electric power to at least the electric devices including a high-load device whose power consumption exceeds a predetermined electric power threshold, by turning off the switch and generating electricity at a second voltage greater than the first voltage, when the controller detects that the high-load device is in operation.

2. The vehicle power supply apparatus according to claim 1, further comprising an idling stop controller configured to stop the engine when a stopping condition is satisfied and starts the engine when a starting condition is satisfied, wherein
the generator comprises a generator motor that revolves and starts the engine by electric power derived from the second electricity storage, and
the idling stop controller stops the engine, on a condition that the second electricity storage is isolated from the generator motor as a result of the controlling by the controller of the switch into the cutoff state in response to the operation of the high-load device, and that the stopping condition of the engine is satisfied.

3. The vehicle power supply apparatus according to claim 2, wherein the controller controls the switch into the electrically-conductive state from the cutoff state, on a condition that the high-load device is in the operation and that the idling stop controller has stopped the engine.

4. The vehicle power supply apparatus according to claim 2, wherein the second electricity storage has internal resistance that is less than internal resistance of the first electricity storage.

5. The vehicle power supply apparatus according to claim 2, wherein the controller includes the idling stop controller.

6. The vehicle power supply apparatus according to claim 3, further comprising a first switch that switches from electric conduction between the generator motor and the first electricity storage to cutoff between the generator motor and the first electricity storage and vice versa, wherein
the switch comprises a second switch, and
the controller controls the first switch into a cutoff state and controls the second switch into the electrically-conductive state, when the idling stop controller starts the engine.

7. The vehicle power supply apparatus according to claim 3, wherein the second electricity storage has internal resistance that is less than internal resistance of the first electricity storage.

8. The vehicle power supply apparatus according to claim 6, wherein the switch controller controls the first switch into an electrically-conductive state from the cutoff state and controls the second switch into the cutoff state from the electrically-conductive state, on a condition that the high-load device is in the operation and that the idling stop controller has started the engine.

9. The vehicle power supply apparatus according to claim 6, wherein the second electricity storage has internal resistance that is less than internal resistance of the first electricity storage.

10. The vehicle power supply apparatus according to claim 8, wherein the second electricity storage has internal resistance that is less than internal resistance of the first electricity storage.

11. The vehicle power supply apparatus according to claim 1, wherein the second electricity storage has internal resistance that is less than internal resistance of the first electricity storage.

12. The vehicle power supply apparatus according to claim 1,
wherein the controller is configured control the switch into an electrically-conductive state and a cutoff state,
wherein the controller being configured to control the switch into the electrically-conductive state and the controller controlling the generator into the first electric power generation state when the high-load device is stopped, the high-load device being one of a plurality of electrical loads that are coupled to the first electricity storage and include the high-load device and a low-load device, and being higher in power consumption than the low-load device.

13. The vehicle power supply apparatus according to claim 1, wherein the controller is configured to control the switch into the cutoff state and the controller controlling the generator into the second electric power generation state when the high-load device is in operation.

14. A vehicle power supply apparatus comprising:
a generator coupled to an engine;
a first electricity storage configured to be coupled to the generator and electric devices in parallel;
a second electricity storage configured to be coupled to the generator in parallel to the first electricity storage via a switch, and configured to be a second terminal voltage greater than a first terminal voltage of the first electricity storage; and
circuitry configured to:
supply electric power to at least the first electricity storage and the second electricity storage, by turning on the switch and generating electricity at a first voltage equal to or greater than the second terminal voltage of the second electricity storage,
supply electric power to at least the electric devices including a high-load device whose power consumption exceeds a predetermined electric power threshold, by turning off the switch and generating electricity at a second voltage greater than the first voltage, when the circuitry detects that the high-load device is in operation.

15. The vehicle power supply apparatus according to claim 14, wherein the circuitry is further configured to:
stop the engine when a stopping condition is satisfied and starts the engine when a starting condition is satisfied, wherein
the generator comprises a generator motor that revolves and starts the engine by electric power derived from the second electricity storage; and
stops the engine, on a condition that the second electricity storage is isolated from the generator motor as a result of the controlling by the circuitry of the switch into the cutoff state in response to the operation of the high-load device, and that the stopping condition of the engine is satisfied.

16. The vehicle power supply apparatus according to claim 14, wherein the circuitry controls the switch into the electrically-conductive state from the cutoff state, on a condition that the high-load device is in the operation and that the circuitry has stopped the engine.

17. The vehicle power supply apparatus according to claim 14, further comprising a first switch that switches from electric conduction between the generator motor and the first electricity storage to cutoff between the generator motor and the first electricity storage and vice versa.

18. The vehicle power supply apparatus according to claim 17, wherein
the switch comprises a second switch, and
the circuitry controls the first switch into a cutoff state and controls the second switch into the electrically-conductive state, when the circuitry starts the engine.

19. The vehicle power supply apparatus according to claim 14, wherein the circuitry controls the first switch into an electrically-conductive state from the cutoff state and controls the second switch into the cutoff state from the electrically-conductive state, on a condition that the high-load device is in the operation and that the circuitry has started the engine.

20. The vehicle power supply apparatus according to claim 14,
wherein the second electricity storage has internal resistance that is less than internal resistance of the first electricity storage.

* * * * *